United States Patent [19]

Skinner et al.

[11] Patent Number: 4,999,030
[45] Date of Patent: Mar. 12, 1991

[54] PROCESS FOR PRODUCING A METHANE-CONTAINING FUEL GAS

[75] Inventors: Geoffrey F. Skinner, Reading; Wieslaw M. Kowal, Henley, both of England

[73] Assignee: Foster Wheeler USA Corporation, Clinton, N.J.

[21] Appl. No.: 467,343

[22] Filed: Jan. 22, 1990

Related U.S. Application Data

[63] Continuation of Ser. No. 162,821, Mar. 2, 1988, abandoned.

[30] Foreign Application Priority Data

Mar. 6, 1987 [GB] United Kingdom ............... 8705275

[51] Int. Cl.$^5$ .................................................. C10J 3/00
[52] U.S. Cl. ................................... 48/197 R; 48/203; 48/210; 48/212; 48/215; 518/703
[58] Field of Search .................... 48/197 R, 202, 203, 48/206, 210, 212, 215; 518/703, 705

[56] References Cited

U.S. PATENT DOCUMENTS

| | | | |
|---|---|---|---|
| 3,779,725 | 12/1973 | Hegarty et al. | 48/202 |
| 3,854,896 | 12/1974 | Switzer et al. | 48/210 |
| 3,888,043 | 6/1975 | Child et al. | 48/197 R |
| 3,904,389 | 9/1975 | Banquy | 48/215 |
| 3,988,237 | 10/1976 | Dairs et al. | 48/210 |
| 4,064,156 | 12/1977 | McRobbie | 518/703 |
| 4,300,916 | 11/1981 | Frewer et al. | 48/210 |
| 4,650,814 | 3/1987 | Keller | 518/703 |

Primary Examiner—Joye L. Woodard
Attorney, Agent, or Firm—Marvin A. Naigur

[57] ABSTRACT

A process for the production of a fuel gas which includes the steps of:

hydrogentation of a liquid hydrocarbon or solid carbonaceous material in the presence of air and optionally steam to produce a raw fuel gas stream comprising methane and unreacted hydrogen, gasification of a liquid hydrocarbon or solid carbonaceous material in the presence of air and optionally steam to produce a second gas stream comprising hydrogen, nitrogen and carbon oxides, removing solids therefrom from the gas streams, mixing the fuel gas stream with the second gas stream and with steam and subjecting the resulting stream to carbon monoxide shift to convert at least a portion of the carbon monoxide present to carbon dioxide with generation of hydrogen, removing at least a portion of the carbon dioxide and other acid gas from the shifted gas stream; and reacting the hydrogen in the gas stream with carbon oxides present in the gas stream to generate methane and subjecting the methanated gas stream to cryogenic separation to yield at least a nitrogen-rich stream, a methane containing fuel gas and a hydrogen gas stream for recycle to the hydrogenation step.

5 Claims, 3 Drawing Sheets

PROCESS FOR PRODUCING A METHANE-CONTAINING FUEL GAS

This application is a continuation of application Ser. No. 07/162,821, filed Mar. 2, 1988, now abandoned.

FIELD OF THE INVENTION

This invention relates to the production of fuel gas and in particular to the production from liquid hydrocarbons or carbonaceous material of synthetic fuel gases having calorific values generally in the range of 10,000 to 40,000 kJ/Nm$^3$ with combustible constituents consisting of hydrogen and methane or methane alone, the latter fuel gas often termed synthetic natural gas (SNG).

BACKGROUND OF THE INVENTION

Two main categories of process have been proposed for the manufacture of such fuel gases as described below with reference to coal as the starting material.

The first category of process consists of gasification of coal with steam and substantially pure oxygen to provide a raw gas having as its main constituents hydrogen, carbon oxides and methane. The raw gas is subjected to processing steps such as carbon monoxide shift, methanation, removal of sulphur compounds, removal of carbon dioxide and/or physical separation methods to produce a fuel gas of the desired calorific value and combustion characteristics. Examples of proposed processes for the production of SNG from coal include the following:

(a) a gasifier containing slowly descending bed of coal either with slagging of the ash (British Gas process) or without slagging of the ash (Lurgi process), cooling of the product and washing to remove tar and aromatic components, removal of sulphur compounds and some carbon dioxide by liquid washes, and methanation to produce pipeline quality SNG.

(b) an entrained-flow gasifier fed with a coal-water slurry (Texaco process), cooling of the tar-free gas, partial carbon monoxide shift, removal of sulphur compounds and some carbon dioxide and methanation to produce pipeline quality SNG.

(c) a fluid bed gasifier (IGT's U-Gas process) followed by a process sequence as in (b) above.

The second category of process depends on the direct hydrogenation of coal to produce methane. Hydrogenation is in principle a thermally more efficient method of producing methane than the above described processes comprising oxygen/steam gasification followed by methanation. This is because the hydrogenation step is less exothermic than methanation and the oxygen/steam gasifier needed to make the necessary hydrogen has only to gasify a part of the coal supply. This type of process has been developed mainly by British Gas and by the Institute of Gas Technology (Hygas Process).

Most hydrogenation-based SNG plants designed to date have contained at least two separate process streams:

a coal hydrogenation stream producing SNG from hydrogen and coal and leaving as a by-product a residual carbonaceous material known as "char"; and a hydrogen production stream producing hydrogen by oxygen/steam gasification of residual char from the hydrogenator, carbon oxide shift and acid gas removal, an optional third steam reforming stream to make additional hydrogen from aromatics produced in the hydrogenator may also be included.

The two types of process described above both utilize substantially pure oxygen as a reactant with carbonaceous material. Oxygen is generally obtained from air by a separation technique e.g. cryogenic separation which is a source of considerable expense in the manufacturing process. Furthermore, strict precautions must be taken with the oxygen-containing stream and oxidation reaction to control the explosive potential of the gases.

It is an object of the present invention to provide a process for the production of fuel gas from carbonaceous material which does not require the use of substantially pure oxygen.

SUMMARY OF THE INVENTION

Therefore according to the present invention there is provided a process for the production of a fuel gas which includes the steps of:

gasification of a liquid hydrocarbon or solid carbonaceous material in the presence of air and optionally steam to produce a gas stream comprising hydrogen, nitrogen and carbon oxides, removing solids therefrom from the gas stream, mixing the gas stream with steam if necessary and subjecting the resulting stream to carbon monoxide shift to convert at least a portion of the carbon monoxide present to carbon dioxide with generation of hydrogen, removing at least a portion of the carbon dioxide and other acid gas from the gas stream;

reacting the hydrogen in the gas stream with carbon oxides present in the gas stream or with solid carbonaceous material to generate methane and subjecting the product gas stream to cryogenic separation to yield at least a nitrogen rich stream and methane containing fuel gas.

The process of the invention allows the use of air rather than substantially pure oxygen in the gasification of carbonaceous material. The nitrogen present in the air is retained in the gas stream and is separated cryogenically during separation of fuel gas. The process is applicable to both types of process described above for the production of synthetic fuel gas.

DETAILED DESCRIPTION OF THE INVENTION

According to one embodiment of the invention the process comprises gasification of a liquid hydrocarbon or a solid carbonaceous material e.g. coal, lignite, peat, char etc, with air, cooling the resulting gas stream and removing the solids and sulphur content therefrom, subjecting the gas stream to carbon monoxide shift to convert a portion of carbon monoxide therein to carbon dioxide with the formation of hydrogen, and treating the resulting gas stream to remove part of the carbon dioxide and other acid gas therefrom, the conditions of the carbon monoxide shift and carbon dioxide removal preferably being adjusted such that the resulting gas stream contains a slight excess of hydrogen over that required to methanate the remaining carbon oxides, passing the gas stream over a methanation catalyst to react the hydrogen and carbon oxides to produce methane, and subjecting the gas stream to cryogenic separation to yield a methane containing fuel gas and nitrogen.

The cryogenic separation may be adjusted to separate any excess hydrogen as a separate stream which may be recycled to the methanator or the fuel gas may comprise a mixture of hydrogen and methane. The waste nitrogen stream may be reheated and expanded through a turbine to generate useful energy.

In accordance with a second aspect of the invention methane is produced in a first gas stream by hydrogenation of a liquid hydrocarbon or solid carbonaceous material e.g. coal, lignite, peat etc., for example, char from the gasification of carbon material in the presence of air and steam, further carbonaceous material, e.g. the char by-product produced in the above stage is subjected to gasification in the presence of air and steam to generate a second gas stream comprising nitrogen, hydrogen, carbon monoxide, which gas stream is cooled and treated to separate solids therefrom, subject to carbon monoxide shift to convert carbon monoxide to carbon oxide with generation of hydrogen, the conditions preferably generating the maximum amount of hydrogen, the first and second gas streams are combined before or after carbon monoxide shift and the combined gas stream treated to remove the acid gas content and optionally carbon monoxide, thereafter the combined gas stream is subjected to cryogenic separation to separate:

(i) a hydrogen stream which is used to hydrogenate the solid carbonaceous material,
(ii) a methane containing fuel gas stream, and
(iii) a waste nitrogen stream which may be heated and expanded through a turbine to recover useful energy.

The fuel gas stream may consist only of methane or may comprise hydrogen depending upon the separation conditions.

The invention will now be described with reference to the accompanying drawings in which.

Figure 1:
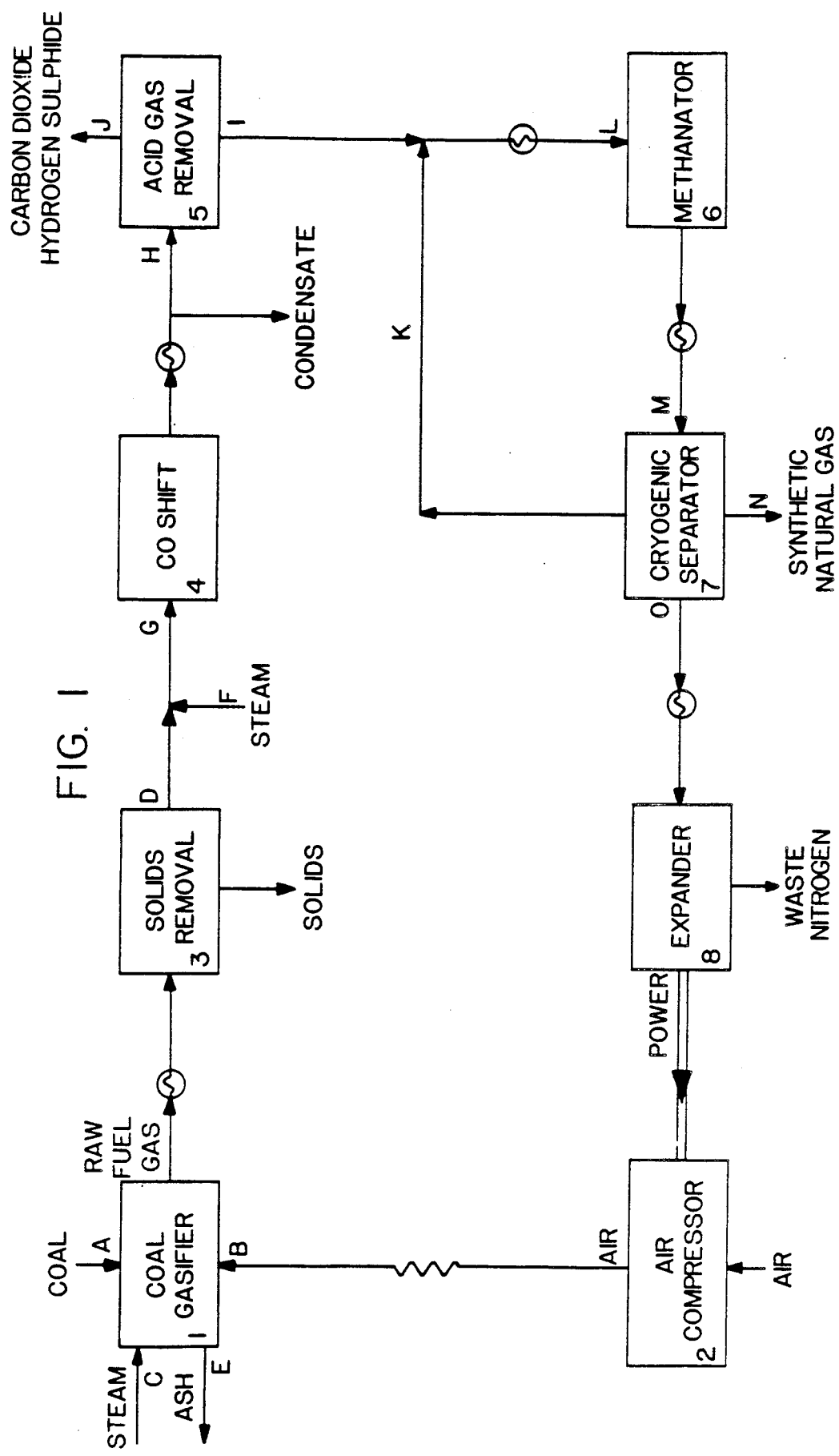
FIG. 1 represents a flow diagram of a synthetic fuel gas production process in accordance with the invention.
Figure 2:
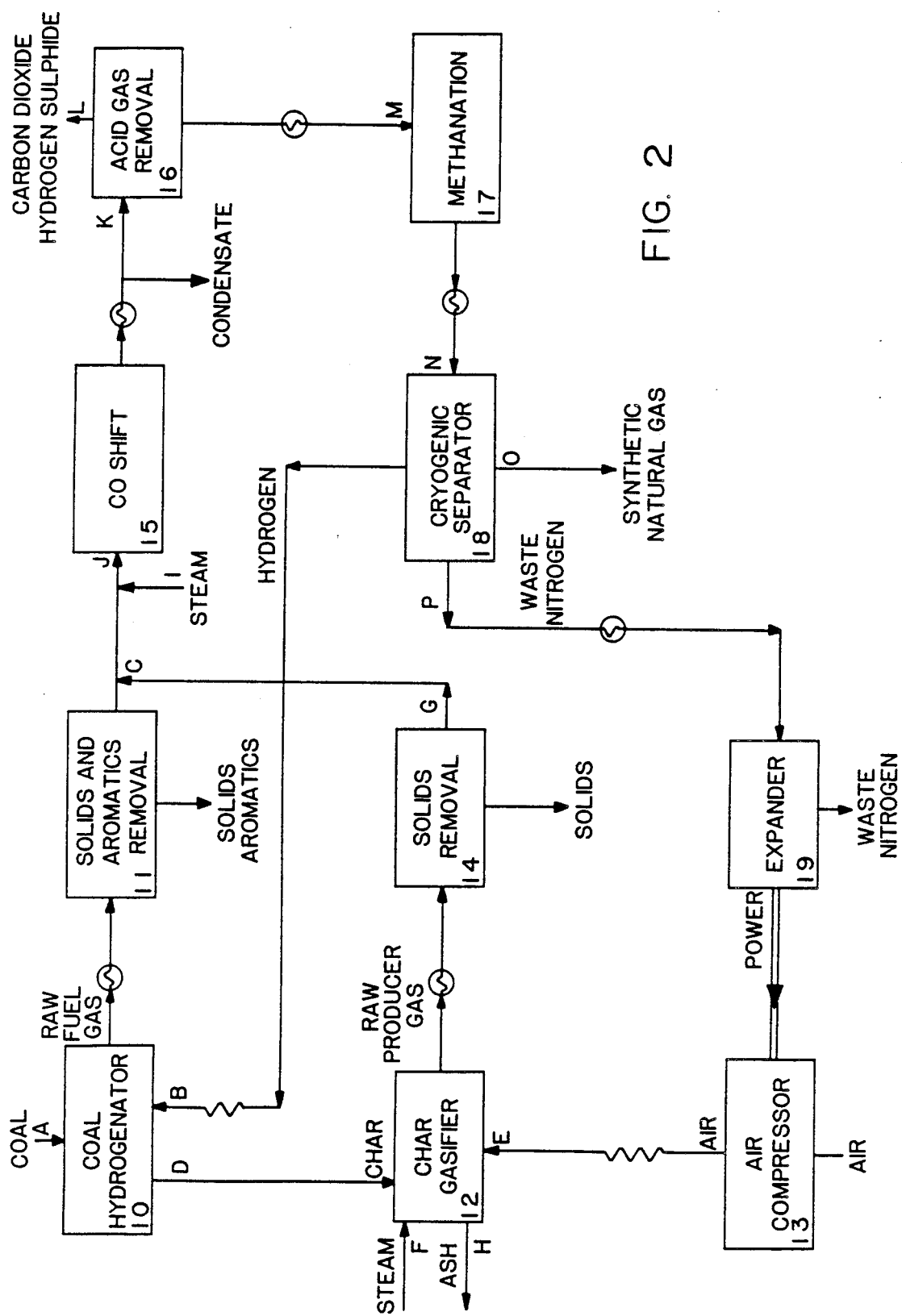
FIG. 2 represents a flow diagram of a second process for the production of fuel gas in accordance with the invention.
Figure 3:
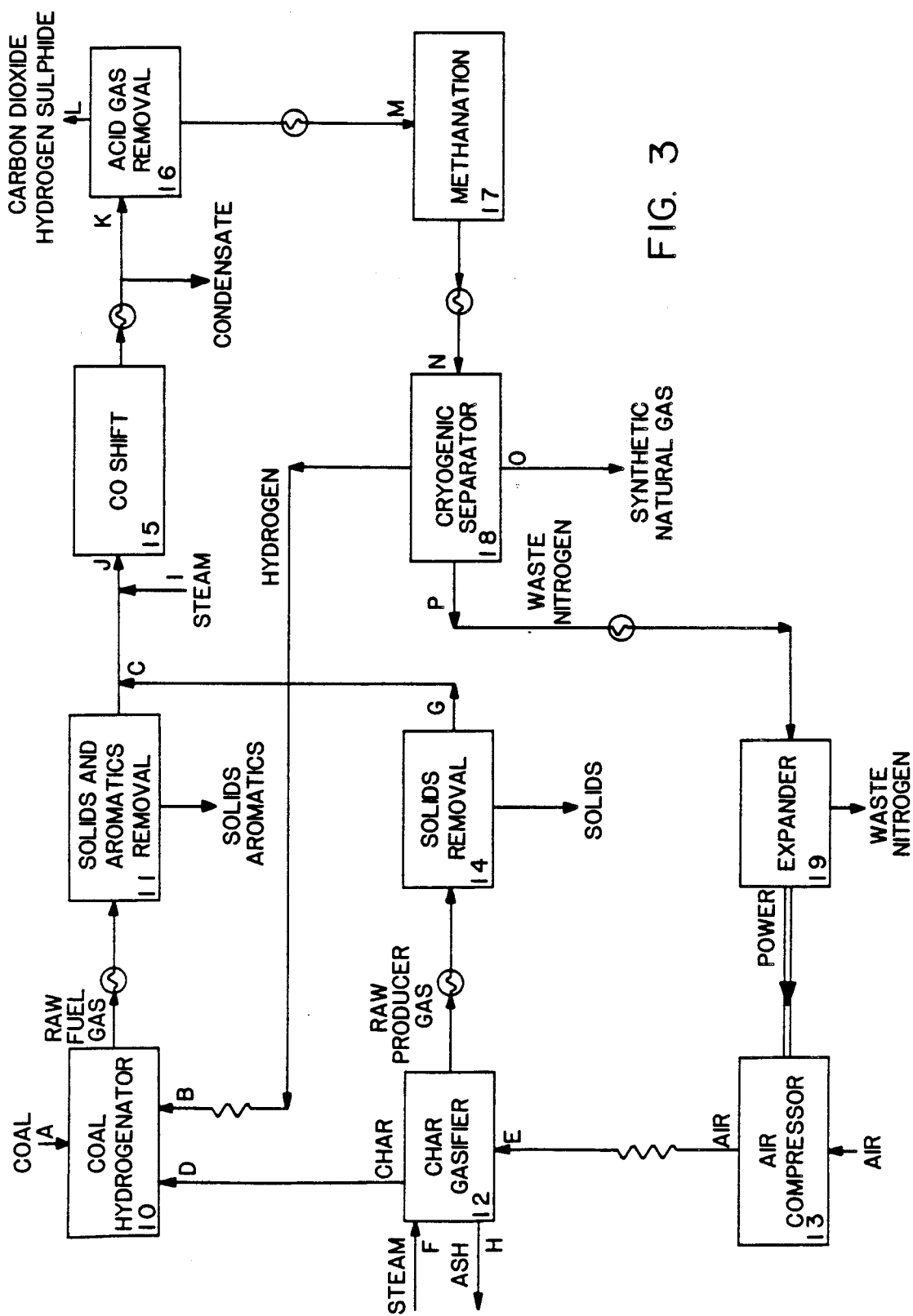
FIG. 3 represents a flow diagram of another embodiment of the second process for the production of fuel gas in accordance with the invention.

FIGS. 1 and 2 disclose typical applications of the subject invention namely the processing of 89 tonnes/hour of bituminous coal to produce approximately 48,000 Nm$^3$/h of synthetic natural gas by the methanation of purified coal gas (FIG. 1) and by the alternative hydrogenation process (FIG. 2).

The following description discloses operating pressures in the range 69 to 59 bar abs although the processes may be practiced in the general range 20 to 120 bar abs.

The methanation process outlined in FIG. 1 consists essentially of the following steps:
gasification of bituminous coal with air and steam at elevated pressure, to produce a nitrogen-rich raw gas
removal of entrained solids from the raw gas
addition of steam to the raw gas
partial shift of the carbon monoxide content to carbon dioxide with evolution of an equivalent volume of additional hydrogen
bulk removal of the carbon dioxide present and complete removal of the sulphur compounds present
addition of recycled hydrogen
methanation of the residual cairo oxides
cryogenic separation of the methanator product gas into a synthetic natural gas stream, a recycled hydrogen-rich stream and a nitrogen-rich waste stream.

A fluid bed coal gasifier 1, operating at 1000° C., gasifies 88,630 kg/h of dry bituminous coal (Point A) by contacting the coal with 6072.4 kgmol/h of compressed air at 500° C./60.00 bar (Point B) and 1055.5 kgmol/h of superheated steam at 500° C./70.00 bar (Point C). The raw fuel gas produced is cooled in a heat exchanger and the entrained solids are removed in 3, resulting in a gas stream of 10375.0 kgmol/h at 350° C./66.50 bar (Point D). The ash content of the feed coal plus a small amount of unconverted carbon leaves the gasifier system at 150° C./1.01 bar at Point E. The solids removal stage may comprise a gas/liquid contactor in which the stream is washed with water to remove entrained solids and aromatic hydrocarbon impurities.

The gasification air is provided by an air compressor 2, which is followed by an air preheater.

In order to provide sufficient steam for the downstream carbon monoxide shift stage, the solids-free raw gas is mixed with 2720.1 kgmol/h of superheated steam at 350° C./70.00 bar at Point F. The combined stream comprising 13095.1 kgmol/h of gas then enters the carbon monoxide shift 4 at 336° C./66.50 bar (Point G).

The carbon monoxide shift 4 may comprise two or more vessels, with intermediate heat exchange, containing a suitable CO shift catalyst based on iron oxide or cobalt sulphide such as are commercially available from United Catalysts, BASF or ICI. The gas stream leaves the catalyst with approximately 74% of its inlet CO content converted to $CO_2$, with evolution of an equal volume of additional hydrogen. The gas is then cooled to nearly ambient temperature and unconverted steam is removed as condensate. The gas then passes to the acid gas removal system 5, with a flow of 12905.2 kgmol/h at 40° C./65.50 bar (Point H).

The gas is then washed with a suitable solvent such a Selexol commercially available from Norton Chemicals, so as to separate an essentially sulphur-free product gas stream containing 1% residual $CO_2$ of 10137.9 kgmol/h at 40° C./64.00 bar at Point I and an acid gas stream by volume of 2763.2 kgmol/h at 40° C./2.00 bar at Point J.

The product gas is next combined with a hydrogen rich recycled stream from downstream, with flow 338.3 kgmol/h at 30° C./64.00 bar (Point K). The combined gas stream is heated in a heat exchanger and enters a methanator system with a flow of 10476.2 kgmol/h at 250° C./63.50 bar (Point L). The hydrogen is preferably slightly in excess of that required to methanate all of the carbon oxides present in the gas stream.

The methanator 6 may comprise one or more vessels containing an appropriate catalyst, such as the nickel catalysts commercially available from BASF or ICI, together with heat exchangers and recycle compressors as needed to convert essentially all the carbon monoxide and carbon dioxide in the incoming gas into methane and also to remove the exothermic heat of reactor as appropriate. The methanated gas is cooled to nearly ambient temperature, process condensate is separated and the gas passes to cryogenic separator 7 with a flow of 7344.4 kgmol/h at 40° C./60.50 bar (Point M).

In the cryogenic separator the incoming gas is separated into the recycle hydrogen-rich stream K, a product methane-rich synthetic natural gas stream of 2143.5 kgmol/h at 30° C./59.00 bar (Point N) and a nitrogen-rich waste gas stream of 4851.9 kgmol/h at 30° C./5.00 bar at Point 0.

The waste gas is then heated in a heat exchanger and finally expanded to near atmospheric pressure in expander turbine 8. The expander is used to provide power for the air compressor 2.

The following Table 1 provides details of the material flows, temperatures and pressures at the principal stages of the processing scheme.

It will readily be appreciated that the process depicted in FIG. 1 may be modified to incorporate other features. For example, the gasifier may comprise a moving-bed (Lurgi-type) or entrained-flow (Texaco-type) gasifier; the sulphur removal stage, may be positioned

TABLE 1

| DESCRIPTION | A COAL FEED | B GASIFI- CATION AIR | C GASIFI- CATION STEAM | D RAW FUEL GAS | E ASH | F SHIFT STEAM | G SHIFT FEED | H SHIFT PRODUCT |
|---|---|---|---|---|---|---|---|---|
| GAS (KGMOL/H): | | | | | | | | |
| $H_2$ | — | — | — | 647.5 | — | — | 647.5 | 3211.2 |
| CO | — | — | — | 3471.9 | — | — | 3471.9 | 908.0 |
| $CO_2$ | — | 1.8 | — | 225.1 | — | — | 225.1 | 2796.2 |
| $N_2$ | — | 4731.7 | — | 4772.8 | — | — | 4772.8 | 4772.8 |
| $CH_4$ | — | — | — | 1106.4 | — | — | 1106.4 | 1106.4 |
| $H_2S$ | — | — | — | 27.6 | — | — | 27.6 | 34.9 |
| $O_2$ | — | 1268.3 | — | — | — | — | — | — |
| COS | — | — | — | 8.4 | — | — | 8.4 | 1.1 |
| Ar | — | 56.9 | — | 56.9 | — | — | 56.9 | 56.9 |
| $C_2H_6$ | — | — | — | — | — | — | — | — |
| $C_4H_{10}$ | — | — | — | — | — | — | — | — |
| Total dry | — | 6058.8 | — | 10316.6 | — | — | 10316.6 | 12887.5 |
| $H_2O(v)$ | — | 13.7 | 1055.5 | 58.4 | — | 2720.1 | 2778.5 | 17.7 |
| Total | — | 6072.4 | 1055.5 | 10375.0 | — | 2720.1 | 13095.1 | 12905.2 |
| SOLIDS (KG/H): | | | | | | | | |
| C | 59648 | — | — | — | 1875 | — | — | — |
| H | 3784 | — | — | — | — | — | — | — |
| O | 6072 | — | — | — | — | — | — | — |
| N | 1152 | — | — | — | — | — | — | — |
| S | 1152 | — | — | — | — | — | — | — |
| A | 16822 | — | — | — | 16822 | — | — | — |
| Total | 88630 | — | — | — | 18697 | — | — | —tz.1/64 |
| °C. | 15 | 500 | 500 | 350 | 150 | 350 | 336 | 40 |
| bar abs | 69.00 | 69.00 | 70.00 | 66.50 | 1.0 | 70.00 | 66.50 | 64.50 |

| DESCRIPTION | I A.G.R. PRODUCT | J ACID GAS | K RECYCLED HYDROGEN | L METHANATOR FEED | M METHANATOR PRODUCT | N SYNTHETIC NATURAL GAS | O WASTE NITROGEN |
|---|---|---|---|---|---|---|---|
| GAS (KGMOL/H): | | | | | | | |
| $H_2$ | 3179.1 | 32.2 | 317.9 | 3497.0 | 368.0 | 16.9 | 33.2 |
| CO | 908.0 | — | — | 908.0 | — | — | — |
| $CO_2$ | 101.2 | 2695.0 | — | 101.2 | — | — | — |
| $N_2$ | 4472.8 | — | 18.0 | 4790.8 | 4790.8 | 21.6 | 4751.2 |
| $CH_4$ | 1106.4 | — | 2.4 | 1108.8 | 2118.0 | 2105.0 | 10.6 |
| $H_2S$ | — | 34.9 | — | — | — | — | — |
| $O_2$ | — | — | — | — | — | — | — |
| COS | — | 1.1 | — | — | — | — | — |
| Ar | 56.9 | — | — | 56.9 | 56.9 | — | 56.9 |
| $C_2H_6$ | — | — | — | — | — | — | — |
| $C_4H_{10}$ | — | — | — | — | — | — | — |
| Total dry | 10124.4 | 2763.2 | 338.3 | 10462.7 | 7333.7 | 2143.5 | 4851.9 |
| $H_2O(v)$ | 13.5 | — | — | 13.5 | 10.7 | — | — |
| Total | 10137.9 | 2763.2 | 338.3 | 10476.2 | 7344.1 | 2143.5 | 4851.9 |
| SOLIDS (KG/H): | | | | | | | |
| C | — | 1875 | — | — | — | — | — |
| H | — | — | — | — | — | — | — |
| O | — | — | — | — | — | — | — |
| N | — | — | — | — | — | — | — |
| S | — | — | — | — | — | — | — |
| A | — | 16822 | — | — | — | — | — |
| Total | — | 18697 | — | — | — | — | — |
| °C. | 40 | 40 | 30 | 250 | 40 | 30 | 30 |
| bar abs | 64.00 | 2.0 | 64.00 | 63.50 | 60.50 | 59.00 | 5.0 |

The nitrogen content of the air remains in the gas stream until the cryogenic separation. The nitrogen content increases the thermal capacity of the gas stream which usefully reduces the exothermic temperature rise in the carbon monoxide shift and methanation reactors.

upstream of the carbon monoxide shift reactor; the carbon monoxide shift and methanation reactions may be conducted in a single reactor and/or may use a single catalyst. It is also possible to combine the hydrogenator and gasifier into a single reactor in a similar manner the Hygas process. The quality of the product fuel gas may be adjusted to desired calorific value by adjusting the cryogenic separation and/or diverting a slip-stream of hydrogen, carbon oxides and nitrogen and combining this slip-stream with the methane gas from the cryogenic separator.

A second embodiment of the invention illustrated in FIG. 2 provides means of generating the hydrogen needed for hydrogenation by gasification of char with air and steam thereby eliminating the expense and potential danger associated with the use of pure oxygen, and efficiently and economically combining the hydrogenation and hydrogen production into one process stream.

The hydrogenation process shown in FIG. 2 consists essentially of the following steps:

partial hydrogenation of bituminous coal in a fluid bed hydrogenator using recycled hydrogen at elevated pressure, to produce a raw fuel gas stream containing mainly methane and unreacted hydrogen removal of entrained solids and trace aromatics from this raw fuel gas rejection of unreacted char from the hydrogenator to a fluid bed gasifier, in which the char is gasified with air and steam to produce a nitrogen rich raw producer gas removal of entrained solids from this raw producer gas combination of the said raw fuel and producer gases addition of steam to the combined raw gas stream more complete shift of the carbon monoxide content to carbon dioxide than in Example A partial removal of the carbon dioxide present and complete removal of the sulphur compounds present methanation of the residual carbon oxides cryogenic separation of the methanator product into a synthetic natural gas stream, a hydrogen rich stream for recycle to the hydrogenator and nitrogen-rich waste stream A fluid bed hydrogenator 10, operating at 800° C., is fed with 88,630 kg/h of bituminous coal (Point A) and 2503.1 kgmol/h of a preheated recycled hydrogen-rich gas at 500° C./69.00 bar (Point B). A raw fuel gas is produced consisting mainly of methane and unreacted hydrogen. This is cooled in a heat exchanger, and entrained solids and trace aromatics are removed at 11, e.g. in a gas liquid contactor as in FIG. 1, resulting in a gas stream of 2123.8 kgmol/h at 350° C./66.50 bar at Point C.

Unreacted char leaves the hydrogenator in a stream of 69,385 kg/h at 800° C./69.00 bar (Point D) and enters fluid bed gasifier 12, conveniently under the influence of gravity, in which it is reacted at 1000° C. with 4807.7 kgmol/h of compressed air at 500° C./70.00 bar (Point F). The raw producer gas made is cooled in a heat exchanger and entrained solids are removed in 14, resulting in a gas stream of 9346.3 kg/mol/h at 350° C./66.50 bar (Point G). The ash content of the feed coal plus a small amount of unconverted carbon leaves the gasifier system at 150° C./1.01 bar at Point H.

The gasification air is provided by an air compressor 13, which is followed by an air preheater.

The raw fuel gas and raw producer gases are combined and then mixed with sufficient steam for the downstream carbon monoxide shift stage. The additional steam flow is 1802.3 kgmol/h at 350° C./70.00 bar (Point I). The combined stream comprising 12373.4 kgmol/h of gas then enters the carbon monoxide shift vessel 15 at 341° C./66.50 bar (Point J). The gas stream leaves the shift catalyst with approximately 84% of its inlet CO content converted to carbon dioxide, with evolution of an equal volume of hydrogen. The gas is then cooled to near ambient temperature and unconverted steam is removed as condensate. The gas then passes to the acid gas removal system 16, with a flow of 12732.7 kgmol/h at 40° C./64.50 bar (Point K).

The gas is then washed with a suitable solvent such as activated potassium carbonate solution, Selexol, etc. so as to separate an essentially sulphur-free product gas stream and an acid gas stream of 2635.8 kgmol/h at 40° C./2.00 bar (Point L).

The sulphur-free product gas is next heated in a heat exchanger and enters methanator system 17 with a flow of 10093.1 kgmol/h at 250° C./63.50 bar at Point M. In the methanator the carbon monoxide and carbon dioxide present are essentially converted into methane. The methanated gas is cooled to near ambient temperature, process condensate is separated and the gas passes to cryogenic separator 18 with a flow of 8579.8 kgmol/h at 40° C./60.50 bar (Point N).

In the cryogenic separator, the incoming gas is separated into the recycle hydrogen-rich stream B, a product methane-rich synthetic natural gas stream of 2155.6 kgmol/h at 30° C./59.00 bar (Point O) and a nitrogen-rich waste gas steam of 3848.9 kgmol/h at 30° C./5.00 bar at Point P.

The waste gas is heated and then expanded in expander 19 as in FIG. 1.

The material flows, temperatures and pressures at the principal stages of the processing schemes are reported in the following Table 2.

TABLE 2

| | POINT | | | | | | | |
|---|---|---|---|---|---|---|---|---|
| DESCRIPTION | A COAL FEED | B RECYCLED HYDROGEN | C RAW FUEL GAS | D CHAR | E GASIFICATION AIR | F GASIFICATION STEAM | G RAW PRODUCER GAS | H ASH |
| GAS (KGMOL/H): | | | | | | | | |
| $H_2$ | — | 2410.7 | 825.3 | — | — | — | 1240.3 | — |
| CO | — | — | 12.1 | — | — | — | 2299.2 | — |
| $CO_2$ | — | — | 1.7 | — | 1.4 | — | 715.4 | — |
| $N_2$ | — | 134.7 | 141.7 | — | 3746.2 | — | 3780.3 | — |
| $CH_4$ | — | 17.7 | 778.4 | — | — | — | 705.6 | — |
| $H_2S$ | — | — | 12.6 | — | — | — | 21.1 | — |
| $O_2$ | — | — | — | — | 1004.2 | — | — | — |
| COS | — | — | — | — | — | — | 2.2 | — |
| Ar | — | — | — | — | 45.1 | — | 45.1 | — |
| $C_2H_6$ | — | — | 171.2 | — | — | — | — | — |
| $C_4H_{10}$ | — | — | 19.8 | — | — | — | — | — |
| Total dry | — | 2563.1 | 1962.8 | — | 4796.9 | — | 8809.2 | — |

TABLE 2-continued

| | | | | | | | | |
|---|---|---|---|---|---|---|---|---|
| H₂O(v) | — | — | 161.0 | — | 10.8 | 2044.2 | 537.1 | — |
| Total | — | 2563.1 | 2123.8 | — | 4807.7 | 2044.2 | 9346.3 | — |
| SOLIDS (KG/H): | | | | | | | | |
| C | 59648 | — | — | 45282 | — | — | — | 585 |
| H | 3784 | — | — | 2328 | — | — | — | — |
| O | 6072 | — | — | 3249 | — | — | — | — |
| N | 1152 | — | — | 956 | — | — | — | — |
| S | 1152 | — | — | 748 | — | — | — | — |
| A | 16822 | — | — | 16822 | — | — | — | 16822 |
| Total | 88630 | — | — | 69385 | — | — | — | 17407 |
| °C. | 15 | 500 | 350 | 800 | 500 | 500 | 350 | 150 |
| bar abs | 69.00 | 69.00 | 66.50 | 69.00 | 69.00 | 70.00 | 66.50 | 1.01 |

| | POINT | | | | | | | |
|---|---|---|---|---|---|---|---|---|
| | I SHIFT STEAM | J SHIFT FEED | K SHIFT PRODUCT | L ACID GAS | M METHANATOR FEED | N METHANATOR PRODUCT | O SYNTHETIC NATURAL GAS | P WASTE NITROGEN |
| GAS (KGMOL/H): | | | | | | | | |
| H₂ | — | 2065.6 | 4007.2 | 40.1 | 3967.1 | 2455.1 | 16.9 | 27.5 |
| CO | — | 2311.3 | 369.6 | — | 369.6 | — | — | — |
| CO₂ | — | 717.1 | 2660.6 | 2559.8 | 100.8 | — | — | — |
| N₂ | — | 3922.0 | 3922.0 | — | 3922.0 | 3922.0 | 21.6 | 3765.7 |
| CH₄ | — | 1484.0 | 1484.0 | — | 1484.0 | 1954.4 | 1926.1 | 10.6 |
| H₂S | — | 33.7 | 35.5 | 35.5 | — | — | — | — |
| O₂ | — | — | — | — | — | — | — | — |
| COS | — | 2.2 | 0.4 | 0.4 | — | — | — | — |
| Ar | — | 45.1 | 45.1 | — | 45.1 | 45.1 | — | 45.1 |
| C₂H₆ | — | 171.2 | 171.2 | — | 171.2 | 171.2 | 171.2 | — |
| C₄H₁₀ | — | 19.8 | 19.8 | — | 19.8 | 19.8 | 19.8 | — |
| Total dry | — | 10772.0 | 12715.4 | 2635.8 | 10079.6 | 8567.6 | 2155.6 | 3848.9 |
| H₂O(v) | 1802.3 | 2500.4 | 17.4 | — | 13.5 | 12.2 | — | — |
| Total | 1802.3 | 13272.4 | 12732.8 | 2635.8 | 10093.1 | 8579.8 | 2155.6 | 3848.9 |
| SOLIDS (KG/H): | | | | | | | | |
| C | — | — | — | — | — | — | — | — |
| H | — | — | — | — | — | — | — | — |
| O | — | — | — | — | — | — | — | — |
| N | — | — | — | — | — | — | — | — |
| S | — | — | — | — | — | — | — | — |
| A | — | — | — | — | — | — | — | — |
| Total | — | — | — | — | — | — | — | — |
| °C. | 350 | 341 | 40 | 40 | 250 | 40 | 30 | 30 |
| bar abs | 70.00 | 66.50 | 64.50 | 2.00 | 63.50 | 60.50 | 59.00 | 5.00 |

It will readily be appreciated that the above process may be modified without departing from the concept of utilizing air as the oxidant and removing the nitrogen cryogenically during methane separation. For example, the gas streams from the hydrogenator and char gasifier could be combined at various points in the process stream such as in the gasifier, in the gasifier product gas cooling equipment or after the carbon monoxide shift. Both the hydrogenator and gasifier may be bed with fresh coal or the gasifier may be fed with fresh coal and char produced therein may be fed to the hydrogenator. Sulphur impurities may be removed from the gas stream by other means e.g. hot gas desulphurisation.

The invention utilizes a process for producing hydrogen in a suitable form for the preparation of methane containing fuel gas, e.g. synthetic natural gas, without the use of substantially pure oxygen currently used in the art. The nitrogen content of the air is removed by cryogenic separation during separation of the fuel gas. As the differences between the boiling points of liquid hydrogen and liquid nitrogen, and liquid nitrogen and liquid methane are large compared with the difference between the boiling points of liquid oxygen and liquid nitrogen, the ease of separation of the components in the process of the invention represents a major step in the art compared to the use of pure oxygen which is conventionally obtained by cryogenic separation of air.

We claim:

1. A process for the production of a methane-containing fuel gas which includes the steps of:
   (a) hydrogenating a first liquid hydrocarbon or solid carbonaceous material in the presence of recycled hydrogen to produce a raw fuel gas stream comprising methane and unreacted hydrogen,
   (b) gasifying a second liquid hydrocarbon or solid carbonaceous material in the presence of air to produce a second gas stream comprising hydrogen, nitrogen and carbon oxides,
   (c) removing solids from said gas streams,
   (d) mixing said second gas stream with said raw fuel gas stream and with steam and subjecting the resulting product stream to carbon monoxide shift conditions to convert at least a portion of the carbon monoxide present in said carbon oxides to carbon dioxide with generation of hydrogen,
   (e) removing at least a portion of the carbon dioxide and other acid gas from said product stream,
   (f) reacting the hydrogen in said product stream with carbon oxides present in said product stream to generate methane, (g) subjecting said product stream to cryogenic separation to yield at least a nitrogen-rich stream, a recycle hydrogen stream, and a methane-containing fuel gas, and (h) recycling said recycle hydrogen stream to step (a) to hydrogenate said first liquid hydrocarbon or solid carbonaceous material.

2. A process as claimed in claim 1 in which liquid hydrocarbon or solid carbonaceous material is gasified in step (b) in the presence of air and steam and the carbon monoxide shift conditions in step (d) and the carbon dioxide removal conditions in step (e) are selected to yield said product stream containing carbon oxides and hydrogen in slight excess of that required to methanate the carbon oxides, said product steam being passed over a methanation catalyst in step (f) to form methane from carbon oxides and hydrogen.

3. A process as claimed in claim 1 in which said second liquid hydrocarbon or solid carbonaceous material which is gasified in the presence of air in step (b) comprises char formed in hydrogenation of said first liquid hydrocarbon or solid carbonaceous material in step (a).

4. A process as claimed in claim 1 in which first liquid hydrocarbon or carbonaceous material which is hydrogenated in step (a) comprises char from the gasification of said second liquid hydrocarbon or solid carbonaceous material in the presence of air.

5. A process as claimed in claim 1 in which the nitrogen-rich stream is expanded through a turbine to generate energy.

* * * * *